(12) United States Patent
Mondello et al.

(10) Patent No.: US 11,722,323 B2
(45) Date of Patent: Aug. 8, 2023

(54) PHYSICAL UNCLONABLE FUNCTION WITH NAND MEMORY ARRAY

(71) Applicant: Micron Technology, Inc., Boise, ID (US)

(72) Inventors: Antonino Mondello, Messina (IT); Tommaso Zerilli, Mascalucia (IT); Carmelo Condemi, San Giovanni la Punta (IT); Francesco Tomaiuolo, Acireale (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/895,693

(22) Filed: Aug. 25, 2022

(65) Prior Publication Data
US 2023/0039804 A1    Feb. 9, 2023

Related U.S. Application Data

(63) Continuation of application No. 16/236,005, filed on Dec. 28, 2018, now Pat. No. 11,469,909.

(51) Int. Cl.
*G11C 16/14* (2006.01)
*H04L 9/32* (2006.01)
(Continued)

(52) U.S. Cl.
CPC ............ *H04L 9/3278* (2013.01); *G06F 21/72* (2013.01); *G11C 16/0483* (2013.01);
(Continued)

(58) Field of Classification Search
CPC .................................................... G11C 16/14
(Continued)

(56) References Cited

U.S. PATENT DOCUMENTS

| 10,121,551 B1 | 11/2018 | Miller et al. |
| 11,469,909 B2 | 10/2022 | Mondello et al. |

(Continued)

FOREIGN PATENT DOCUMENTS

| CN | 113366575 A | 9/2021 |
| KR | 101575807 B1 | 12/2015 |

(Continued)

OTHER PUBLICATIONS

"European Application Serial No. 19904458.7, Extended European Search Report dated Aug. 16, 2022", 9 pgs.
(Continued)

*Primary Examiner* — Jason Lappas
(74) *Attorney, Agent, or Firm* — Schwegman Lundberg & Woessner, P.A.

(57) ABSTRACT

Various examples described herein are directed to systems and methods for generating data values using a NAND flash array. A memory controller may read a number of memory cells at the NAND flash array using an initial read level to generate a first raw string. The memory controller may determine that a difference between a number of bits from the first raw string having a value of logical zero and a number of bits from the first raw string having a value of logical one is greater than a threshold value and read the number of memory cells using a second read level to generate a second raw string. The memory controller may determine that a difference between a number of bits from the second raw string having a value of logical zero and a number of bits from the second raw string having a value of logical one is not greater than a threshold value and applying a cryptographic function using the second raw string to generate a first PUF value.

20 Claims, 11 Drawing Sheets

(51) Int. Cl.
  *G11C 16/26* (2006.01)
  *G11C 16/04* (2006.01)
  *G06F 21/72* (2013.01)
  *G11C 16/10* (2006.01)
  *G11C 11/56* (2006.01)

(52) U.S. Cl.
  CPC .............. *G11C 16/10* (2013.01); *G11C 16/14* (2013.01); *G11C 16/26* (2013.01); *G11C 11/5628* (2013.01); *G11C 11/5635* (2013.01); *G11C 11/5642* (2013.01); *G11C 11/5671* (2013.01)

(58) Field of Classification Search
  USPC ...................................................... 365/185.03
  See application file for complete search history.

(56) References Cited

U.S. PATENT DOCUMENTS

| | | | |
|---|---|---|---|
| 2014/0126306 | A1 | 5/2014 | Otterstedt et al. |
| 2015/0055417 | A1 | 2/2015 | Kim et al. |
| 2016/0027504 | A1* | 1/2016 | Lee .................. G11C 16/14 365/185.03 |
| 2016/0093393 | A1 | 3/2016 | Park et al. |
| 2016/0148680 | A1 | 5/2016 | Yoshimoto et al. |
| 2017/0048072 | A1 | 2/2017 | Cambou |
| 2017/0200508 | A1 | 7/2017 | Grigoriev et al. |
| 2017/0229186 | A1 | 8/2017 | Karakulak et al. |
| 2018/0039581 | A1 | 2/2018 | Hung et al. |
| 2020/0213138 | A1 | 7/2020 | Mondello et al. |

FOREIGN PATENT DOCUMENTS

| | | |
|---|---|---|
| KR | 20180059217 A | 6/2018 |
| TW | I616886 B | 3/2018 |
| TW | 202042241 A | 11/2020 |
| TW | I756603 B | 3/2022 |
| WO | WO-2020139690 A1 | 7/2020 |

OTHER PUBLICATIONS

"European Application Serial No. 19904458.7, Response filed Jan. 31, 2022 to Communication pursuant to Rules 161(2) and 162 EPC dated Aug. 13, 2021", 18 pgs.

"International Application Serial No. PCT/US2019/067438, International Preliminary Report on Patentability dated Jul. 8, 2021", 7 pgs.

"International Application Serial No. PCT/US2019/067438, International Search Report dated Apr. 28, 2020", 3 pgs.

"International Application Serial No. PCT/US2019/067438, Written Opinion dated Apr. 28, 2020", 5 pgs.

"Taiwanese Application Serial No. 108147298, Office Action dated Jul. 7, 2021", w/ English Translation, 11 pgs.

"Taiwanese Application Serial No. 108147298, Office Action dated Nov. 6, 2020", w/ English Translation, 4 pgs.

"Taiwanese Application Serial No. 108147298, Response filed Feb. 3, 2021 to Office Action dated Nov. 6, 2020", w/ English Claims, 15 pgs.

"Taiwanese Application Serial No. 108147298, Response filed Oct. 21, 2021 to Office Action dated Jul. 7, 2021", w/English Claims, 11 pgs.

"Korean Application Serial No. 10-2021-7023294, Notice of Preliminary Rejection dated Feb. 28, 2023", with machine English translation, 9 pages.

U.S. Appl. No. 16/236,005, now U.S. Pat. No. 11,469,909, filed Dec. 28, 2018, Physical Unclonable Function with NAND Memory Array.

* cited by examiner

PHYSICAL UNCLONABLE FUNCTION WITH NAND MEMORY ARRAY

PRIORITY APPLICATION

This application is a continuation of U.S. application Ser. No. 16/236,005, filed Dec. 28, 2018, which is incorporated herein by reference in its entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of memory cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
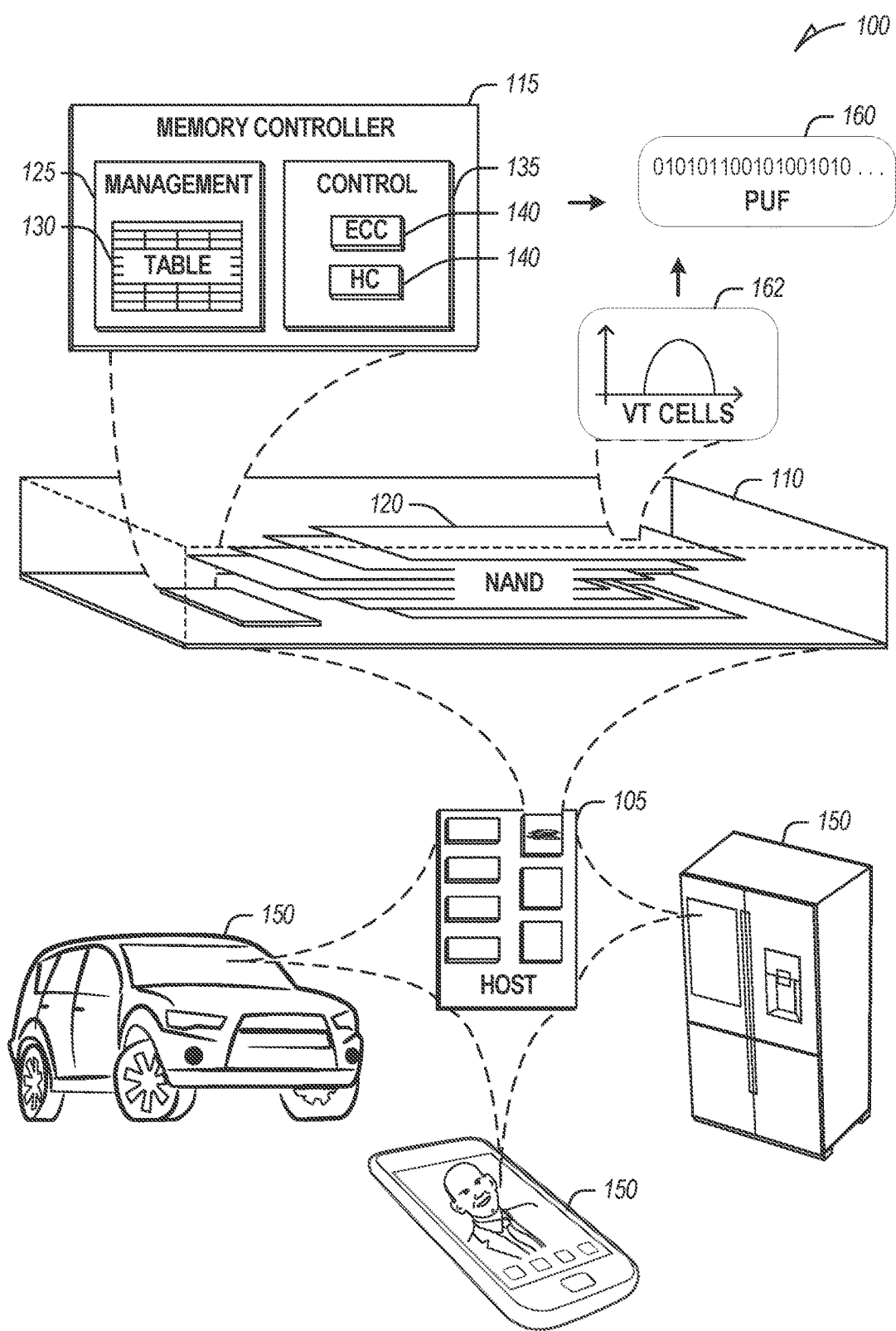
FIG. 1 illustrates an example of an environment including a memory device.

Various examples described herein are directed to systems and methods for generating cryptographic keys using memory cells of a NAND flash array. The cryptographic key may be a physical unclonable function (PUF) derived using the NAND flash array.

In some examples, it is desirable to use a PUF to generate cryptographic keys on a storage volume, such as an SSD, UFS, MMC, eMMC, etc. A storage volume can use cryptographic keys, for example, for security purposes. Some storage volumes receive commands that are encrypted or otherwise cryptographically signed using a cryptographic key. If the command is not encrypted or signed using the cryptographic expected by the storage volume, the storage volume can decline to execute the command. Also, in some examples, a storage volume can encrypt and/or decrypt stored data using a cryptographic key.

When a storage unit utilizes a cryptographic key, the cryptographic key is stored at the storage unit and/or accessible to the storage unit. One example way to provide a cryptographic key to a storage unit is to inject an external cryptographic key, for example, during the production of the storage unit. The injected cryptographic key is stored at the storage unit at a secure key database. Injecting an external cryptographic key, however, can be less secure than other arrangements, for example, because the key database can be vulnerable to unauthorized access.

Some storage units can be arranged to generate cryptographic keys using a PUF. A PUF is a unique data value that can be detected from a subject semiconductor device, such as a memory device, based on properties of the subject semiconductor device. For example, small process variations in the manufacture of memory and other semiconductor devices can cause otherwise similar semiconductor devices to exhibit slightly different behavior. These small differences in behavior can detected and used to generate PUF values. PUF values are data derived from unique properties of one or more subject semiconductor components. PUF values can be used, for example, to generate cryptographic keys and to generate random or pseudorandom numbers.

Various examples described herein generate PUF values using a number of memory cells from a NAND flash array as the subject semiconductor devices. In some examples, the memory cells include all or most of the memory cells in a block of the NAND flash array. The memory cells have a distribution of threshold voltages. The threshold voltage of a NAND memory cell is the lowest voltage applied to the cell's control gate that will cause the cell to conduct current on its bit line. The threshold voltage of a NAND memory cell depends on the level of charge on the cell. For example, in many NAND flash memory cells, adding charge to the cell increases the threshold voltage.

Due to process variations during manufacture, different memory cells respond to similar programming with different threshold voltages. For example, a number of similarly-programmed memory cells may exhibit a distribution of threshold voltages. The memory cells can be similarly programmed, for example, at power-up of the NAND flash array and/or after programming, as described herein.

A memory controller can generate a PUF value by reading the number of memory cells at an initial read level to generate a raw string. The initial read level may be at or near a median threshold voltage of the distribution, for example, such that about half of the memory cells return a logical zero and about half of the memory cells return a logical one. The raw string is optionally compressed using a hash algorithm to generate the PUF value. The PUF value may then be used, for example, as a cryptographic key, as a random number, and/or for any other suitable purpose.

In some examples, the distribution of threshold voltages over the number of memory cells can change over time. For example, threshold values for NAND memory cells may tend to decrease over time, causing the distribution to shift. In some cases, the distribution can also change in shape, for example, if the threshold voltages of some memory cells shift more or more quickly than those of others.

The memory controller may be configured to monitor a quality of the distribution of threshold voltage at the memory cells to detect and, optionally, correct for changes in the distribution. In some examples, upon reading a raw string from the memory cells, the memory controller is programmed to determine a difference between the number of bits in the raw string that have a logical value of zero (Bit0) and a number of bits in the raw string that have a logical value of one (Bit1). If the difference between Bit0 and Bit1 is not greater than a threshold value, the distribution may be of sufficient quality and the memory controller can generate a PUF value from the raw string as described herein. On the other hand, if the difference between Bit0 and Bit1 is greater than the threshold value, it can indicate that the read level is not at or about the median threshold voltage. The memory controller can select a new read level that generates a new raw string for which the difference between Bit0 and Bit1 is not greater than the threshold value. The new raw string is then used to generate a PUF value.

In some examples, the memory controller is configured to re-program the number of memory cells. This can occur, for example, if the distribution of threshold voltages has changed in a way that makes it difficult or not possible to find a new read level for which the difference between Bit0 and Bit1 is not greater than the threshold value. It can also occur, for example, if the threshold voltages of some of the memory cells are less than zero. This can cause the lower bound of the distribution of threshold voltages to be negative, as shown in more detail therein. Reprogramming the memory cells can include erasing the block at the NAND flash array that includes the memory cells. Upon erasure, the memory controller can provide a predetermined number of programming pulses to the memory cells. Providing the same programming pulse or pulses to the memory cells results in a new distribution of threshold voltages. The memory controller can select a new read level based on the new distribution and utilize the new read level to generate PUF values, as described herein.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 may be a machine having some portion, or all, of the components discussed in reference to the machine 1100 of FIG. 11.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable logical states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

The memory controller 115 and memory array 120 can be configured to generate a PUF value 160, as described herein. For example, a number of memory cells of the memory array 120 such as, for example, one block of memory cells, can exhibit a distribution 162 of threshold voltages. The memory controller 115 can read the number of memory cells to generate a raw string. The raw string can be compressed, for example, utilizing a hash function as described herein, to generate the PUF value 160.

Figure 2:
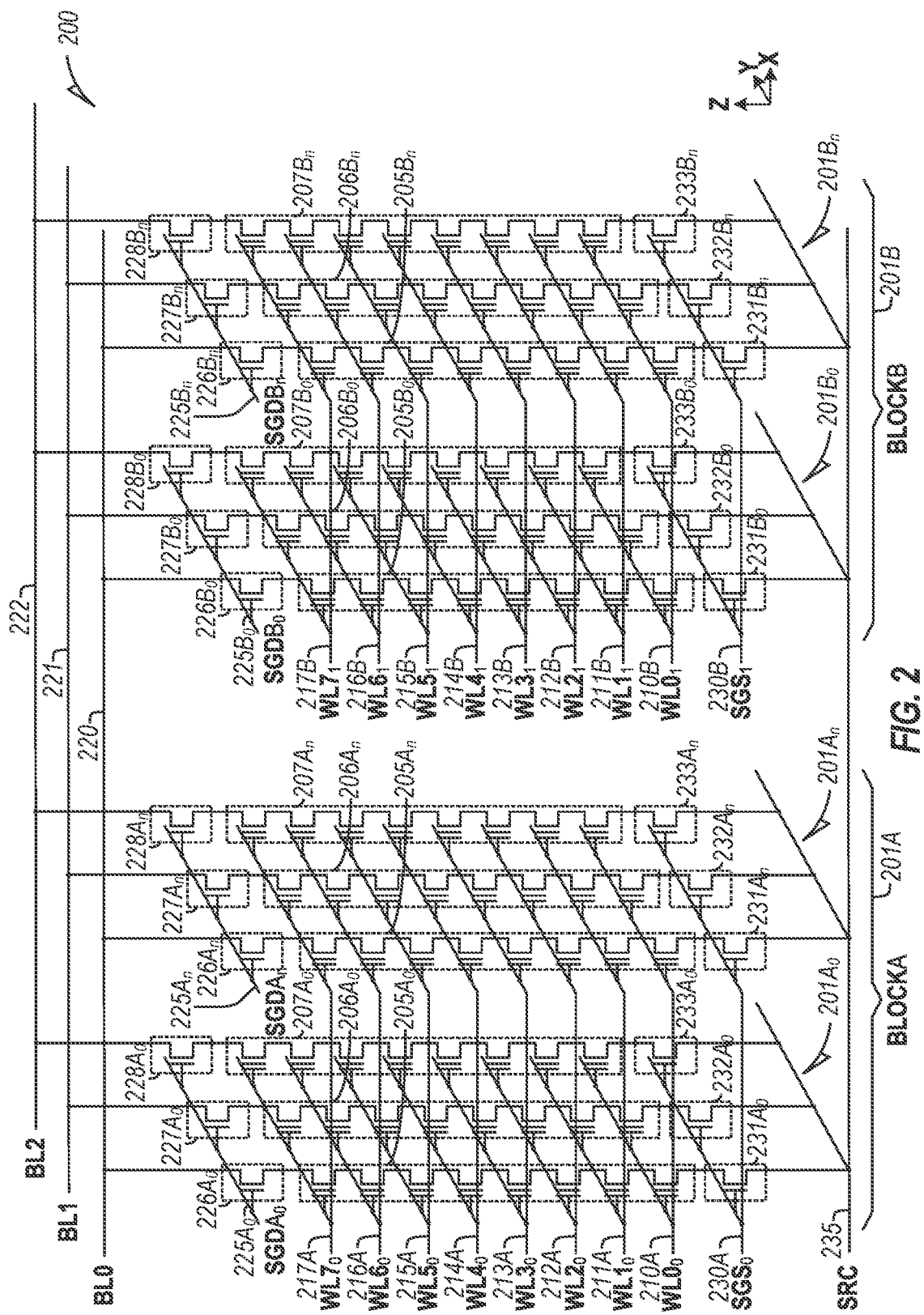
FIGS. 2-3 illustrate schematic diagrams of example NAND architecture semiconductor memory arrays.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines—BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate coupled to (e.g., electrically or otherwise operatively connected to) an access line (e.g., word lines $WL0_0$-$WL7_0$ 210A-217A, $WL0_1$-$WL7_1$ 210B-217B, etc.), which collectively couples the control gates across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates of each memory cell or select gate (or a portion of the control gates or select gates) of a respective tier of the array. Specific strings of memory cells in the array can be accessed, selected, or controlled using a combination of bit lines and select gates, etc., and specific memory cells at one or more tiers in the specific strings can be accessed, selected, or controlled using one or more access lines (e.g., word lines).

Figure 3:
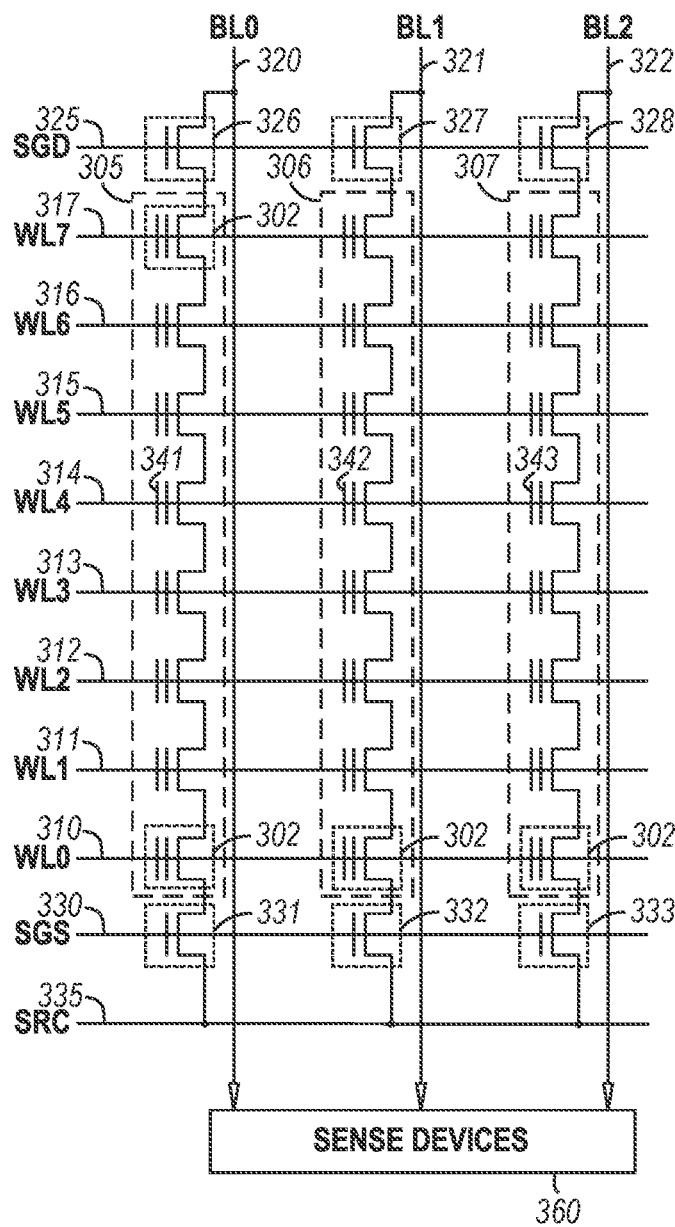

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines BL0-BL2 320-322) using a respective drain-side select gate (SGD) (e.g., first-third SGD 326-328). Although illustrated with 8 tiers (e.g., using word lines WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates 341-343 of the memory cells coupled to WL4). Programming pulses can begin, for example, at or near 15V and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
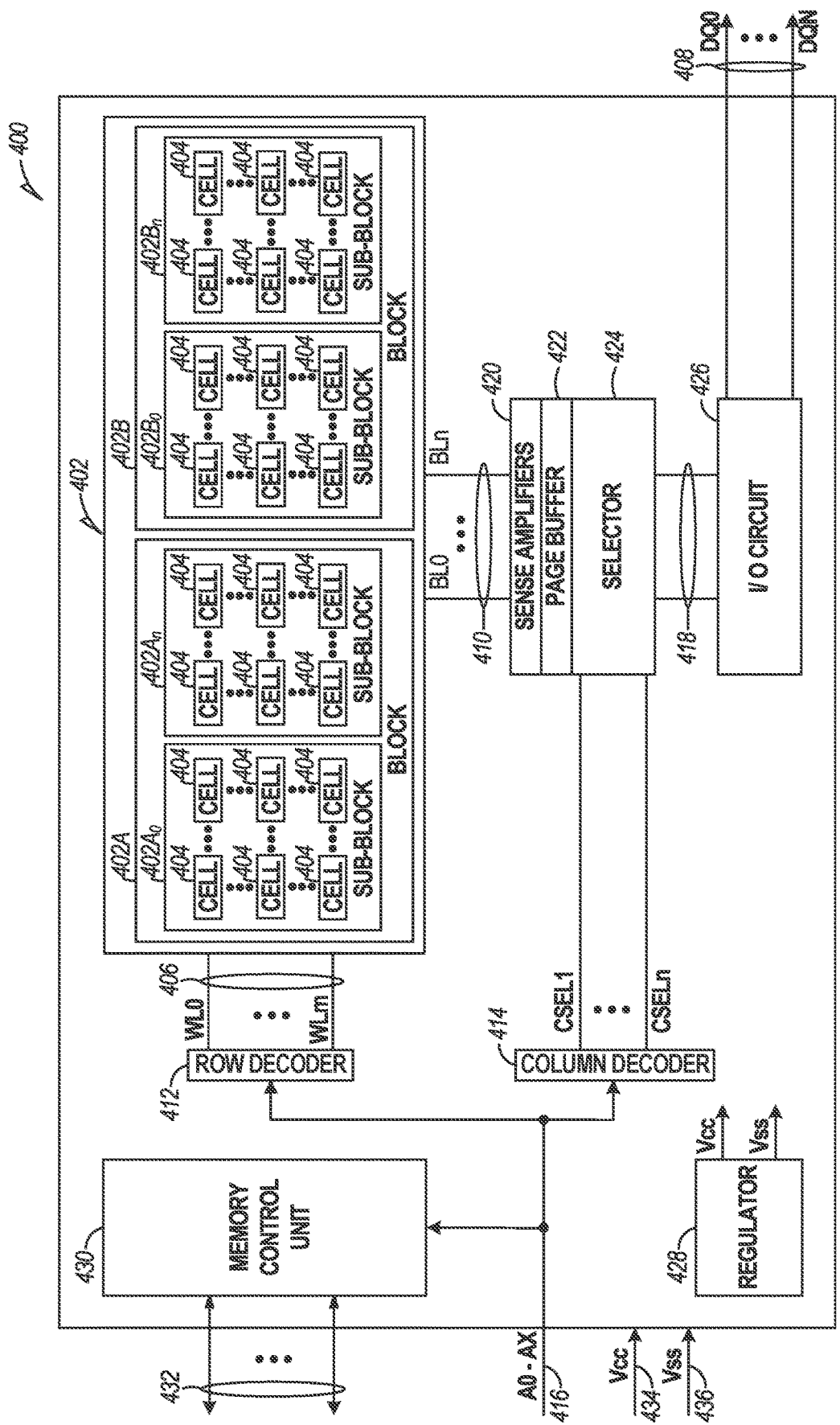
FIG. 4 illustrates an example block diagram of a memory module.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
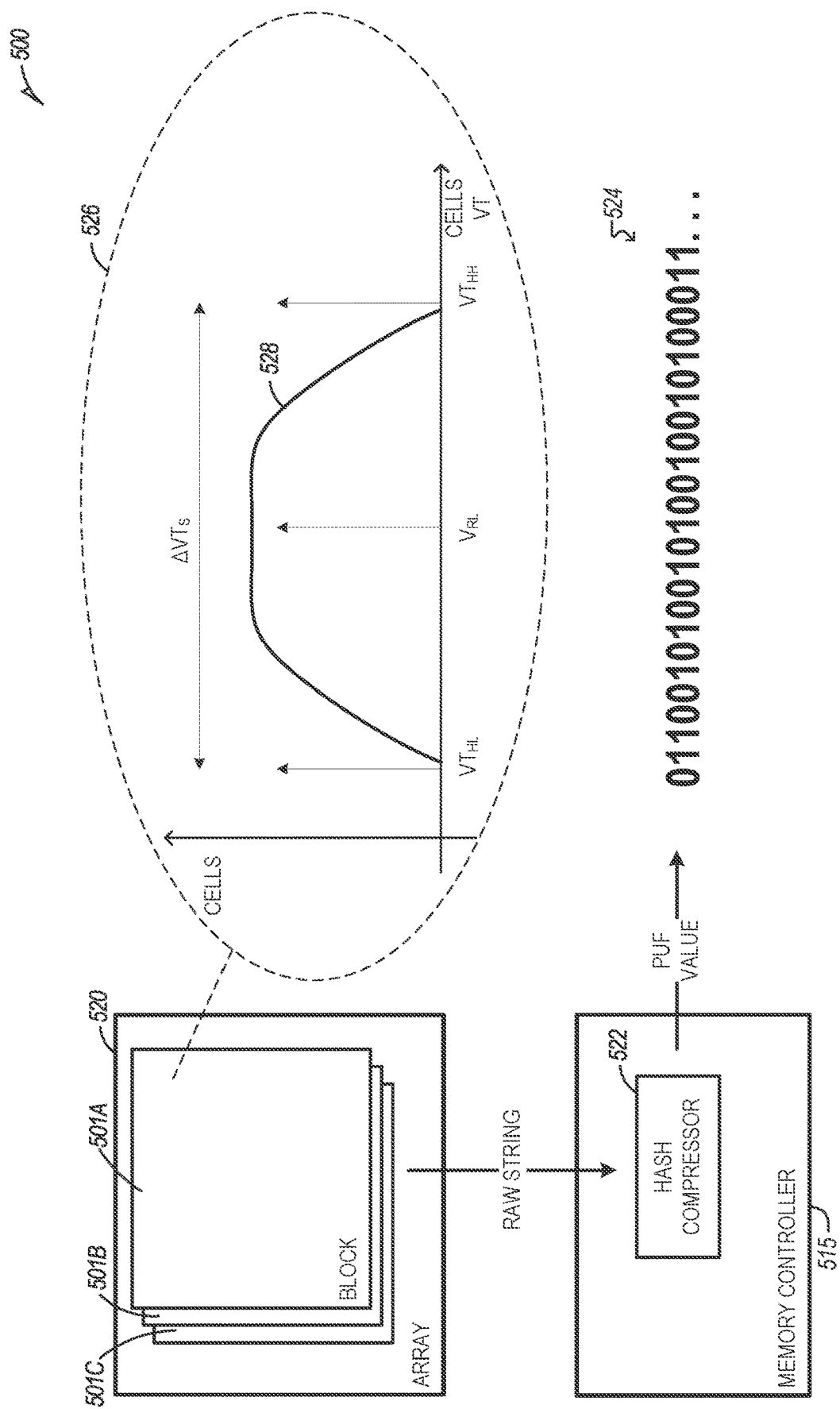
FIG. 5 illustrates an example environment including a memory array and memory controller and demonstrating techniques for generating a PUF value.

FIG. 5 illustrates an example environment 500 including a memory array 520 and memory controller 515 and demonstrating techniques for generating a PUF value. The memory array 520 is a NAND memory array comprising a number of blocks 501A, 501B, 501C. Each block 501A, 501B 501C includes a number of memory cells. The memory controller 515 uses memory cells, in this example from block 501A, to generate a PUF value 524. In some examples, all or most of the memory cells of the block 501A are used to generate the PUF value 524.

FIG. 5 also shows a plot 526 showing a distribution 528 of threshold voltages for the number of memory cells used to generate the PUF value 524. The distribution 528 is shown on a set of axes including a horizontal or x-axis indicating memory cell threshold voltages and a vertical or y-axis indicating a number of cells. A lower bound of the distribution 528 is indicated by $VT_{HL}$ and an upper bound the distribution 528 is indicated by $VT_{HH}$. The range of the distribution 528 is indicated by $\Delta VTs$. An initial read level is indicated by $V_{RL}$. As shown in the initial read level $V_{RL}$ is roughly at a median threshold voltage of the distribution 528. As a result, when the memory cells are read at the initial read level $V_{RL}$ about half of the resulting raw string will have a logical value of one (Bit1) and about half will have a logical value of zero (Bit0).

The memory controller 515 includes a hash compressor 522. The hash compressor 522 applies a cryptographic function, such as a hash function, to comprise the raw string and generate the PUF value 524. For example, the raw string can include one bit for each read memory cell. In some implementations, this can result in a raw string that can include, for example, hundreds of bits, thousands of bits, tens of thousands of bits, etc. The hash compressor 522 can be or include any suitable combination of hardware or software to apply a cryptographic function to reduce the raw string. Any suitable cryptographic function can be used such as, for example, SHA256/512. In some examples, the hash compressor 522 is arranged to generate a PUF value 524 of a predetermined size. For example, the PUF value 524 can include 34 bytes, 64 bytes or any other suitable value. When the PUF value 524 is used as a cryptographic key, for example, a 64 byte PUF value 524 may be suitable for Eliptic Curve Diffie Hellman (ECDH) and/or Eliptic Curve Digital Signature Algorithm (ECDSA). Also, a 32 bye PUF value 524 may be suitable for some symmetric encryption algorithms.

Figure 6:
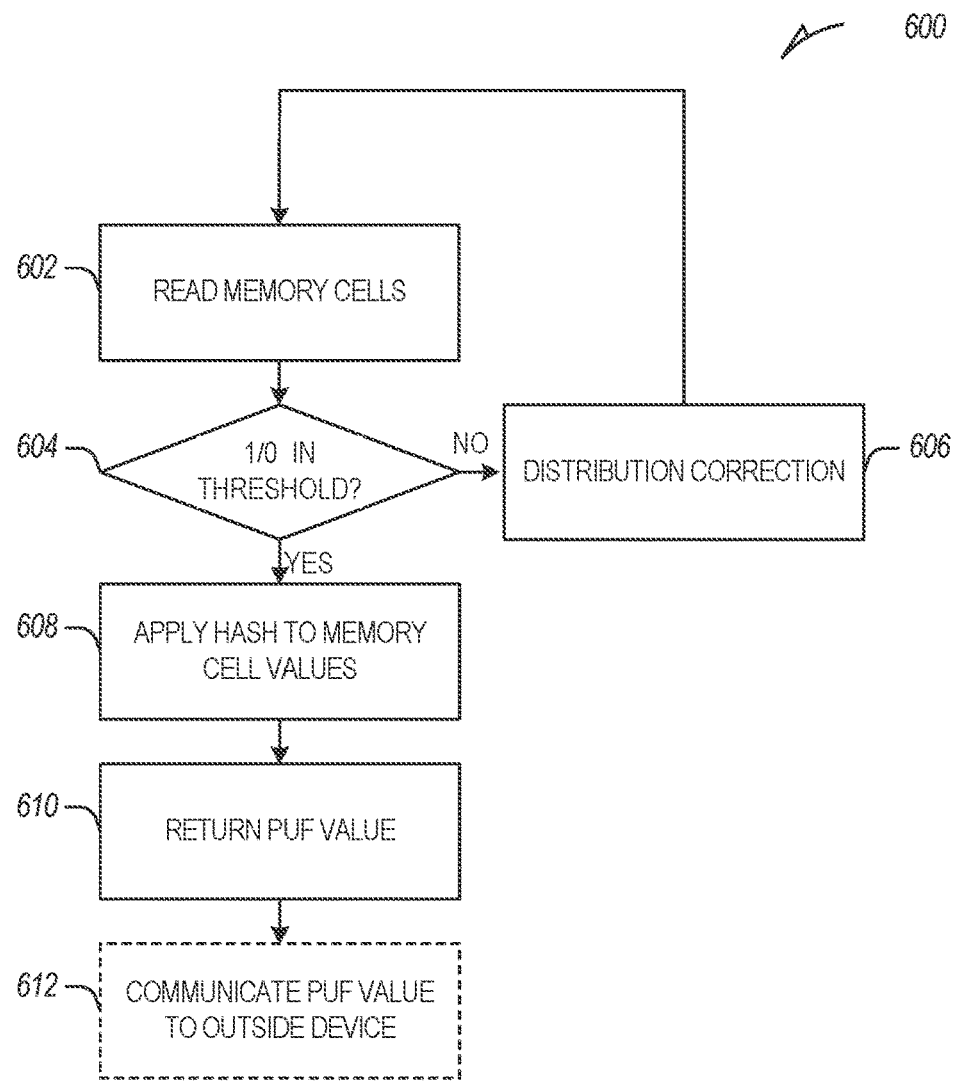
FIG. 6 is a flowchart showing one example of a process flow that can be executed by the memory controller to generate the PUF value.

FIG. 6 is a flowchart showing one example of a process flow 600 that can be executed by the memory controller 515 to generate the PUF value 524. At operation 602, the memory controller 515 reads the number of memory cells at the block 501A. The read uses an initial read level, indicated by $V_{RL}$ and generates an initial raw string. At operation 604, the memory controller determines whether a difference between Bit0 and Bit1 for the initial raw string is greater than a threshold value. This is illustrated by Equation [1] below:

$$|Bit0-Bit1|>N \quad [1]$$

In Equation [1], the threshold value is indicated by N. The threshold N can be, for e example, a predetermined percentage of the total number of bits in the raw string. Any suitable percentage may be used. In some examples, N is between 0 and 20% of the total number of bits in the raw string. In some examples, N is 5% of the total number of bits in the raw string. In some examples, N is 10% of the total number of bits in the raw string. If the difference between Bit0 and Bit1 is greater than the threshold, then the memory controller 515 may correct the distribution at operation 606. This can include, for example, selecting a new read level and/or erasing and reprogramming the memory cells. Examples describing distribution correction are described herein, for example, with respect to FIGS. 7-10. If distribution correction at operation 606 is successful, the memory controller 515 can return to operation 602.

If the difference between Bit0 and Bit1 is not greater than the threshold value, then the memory controller 515 can, at operation 608, use the hash compressor 522 to compress the initial raw string to generate the PUF value 524. At operation 610, the memory controller 522 returns the PUF value 524. The PUF value 524 can be used, for example, as a cryptographic key, as a random number, and/or for any other suitable purpose.

At optional operation 612, the memory controller 515 communicates the PUF value 524 to an outside device. For example, when the PUF value 524 is used as a symmetric cryptographic key, it may be desirable to provide the PUF value 524 to another device that will use the PUF value 524 to communicate with the memory device including memory controller 515 and array 520. Any suitable technique can be used to communicate the PUF value 524 including, for example, a key exchange algorithm such as Diffie-Hellman.

Figure 7:
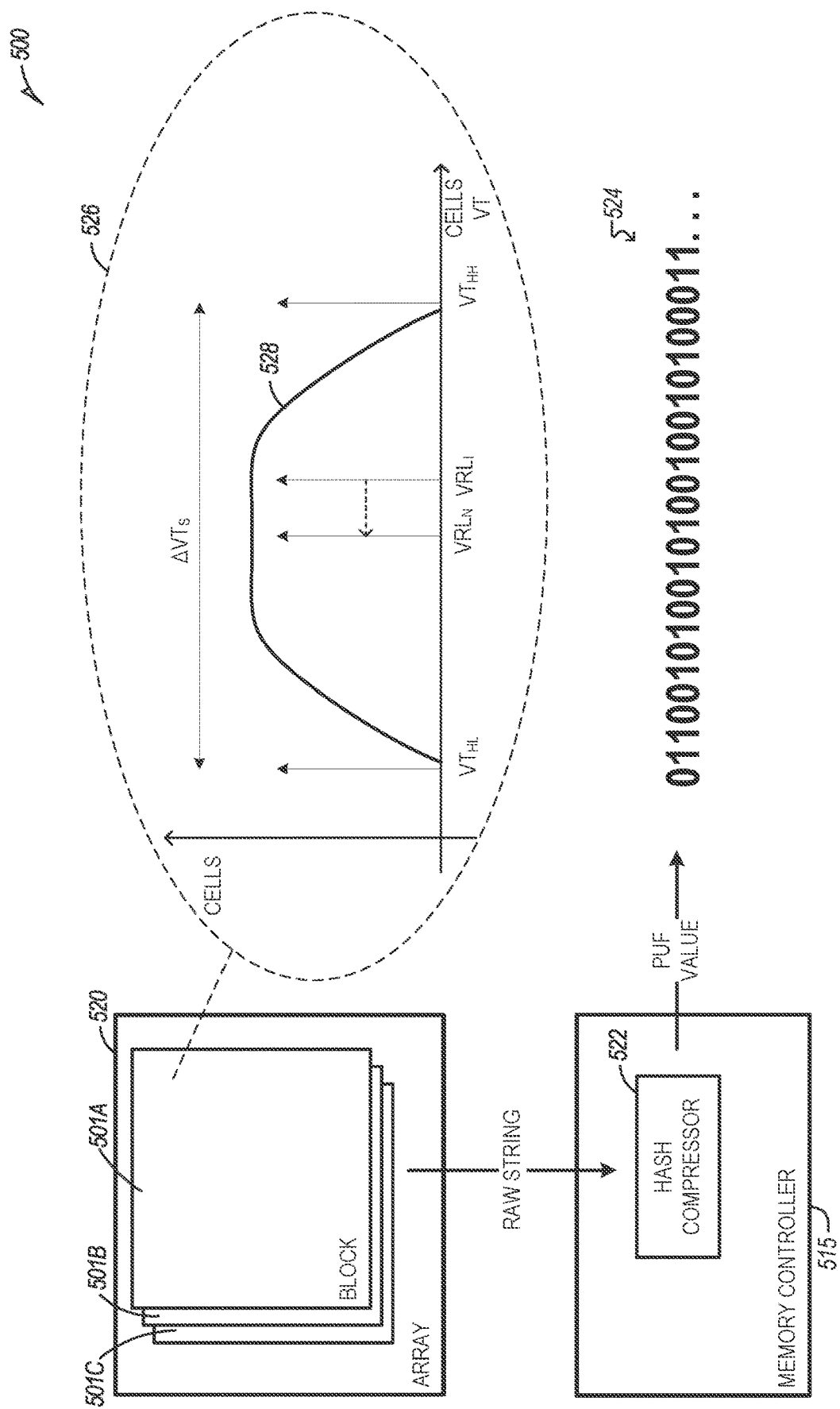
FIG. 7 illustrates an example of the environment of FIG. 5 in which the distribution of threshold voltages for the memory cells has decayed.

In some examples, if the difference between Bit0 and Bit1 is greater than the threshold value, the memory controller 515 may attempt to find a next read level such that the difference between Bit0 and Bit1 is not greater than the threshold value. FIG. 7 illustrates an example of the environment 500 of FIG. 5 in which the distribution 528 has decayed. In the example of FIG. 7, the initial read level $VRL_I$ is shifted to a next read level $VRL_N$. At the next read level, the difference between Bit0 and Bit1 may not be greater than the threshold value.

Figure 8:
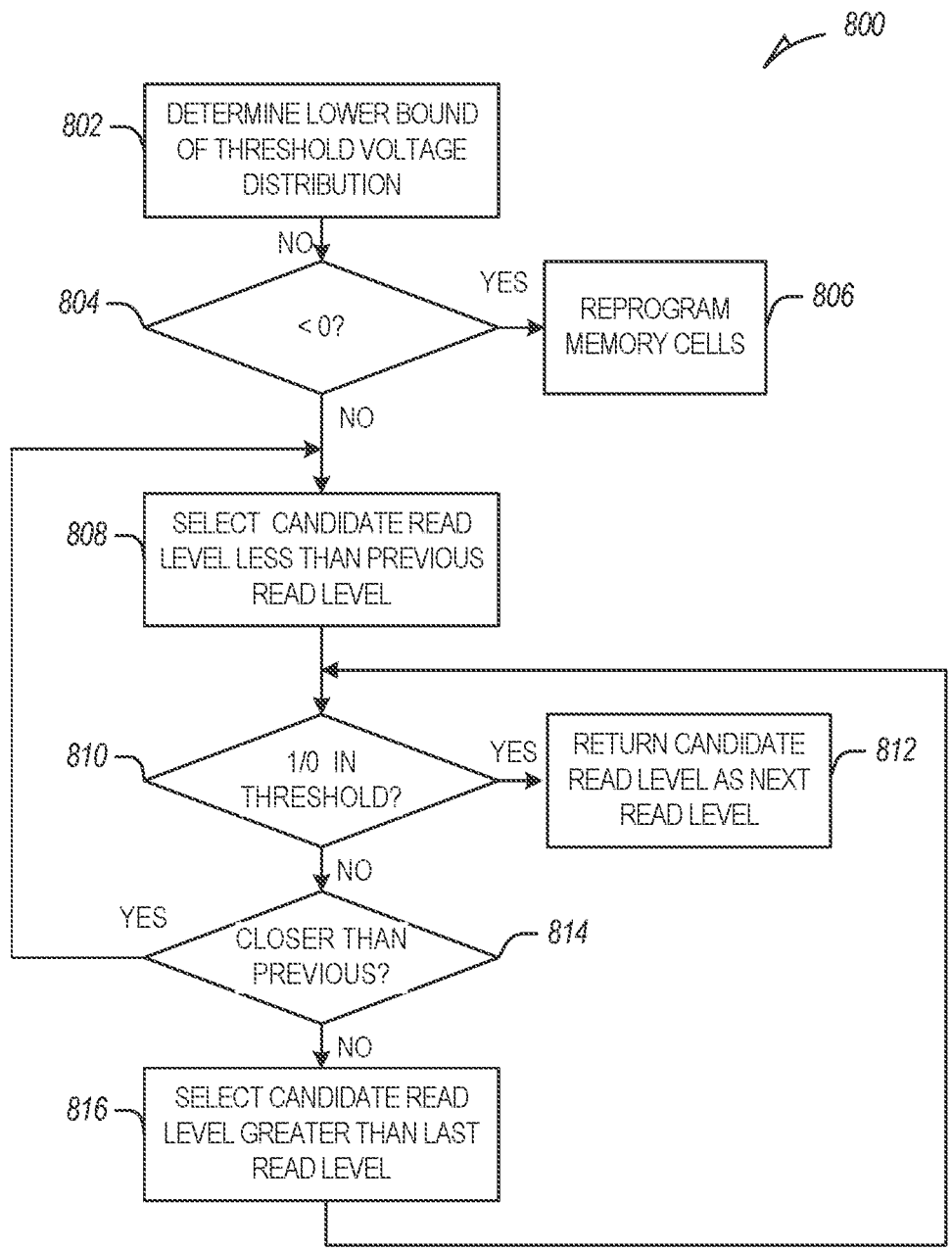
FIG. 8 is a flowchart showing one example of a process flow that can be executed by the memory controller to generate a next read level.

The memory controller 515 can generate the next read level $VRL_N$ in any suitable manner including, for example, using a binary search approach. FIG. 8 is a flowchart showing one example of a process flow 800 that can be executed by the memory controller 515 to generate a next read level $VRL_N$. At operation 802, the memory controller 515 determines a lower bound of the distribution 528. This can be determined in any suitable manner. For example, the memory controller 515 can iteratively lower the read level from the initial read level until all (or more than a threshold number) of the memory cells does not conduct current.

At operation 804, the memory controller 515 determines if the lower bound of the distribution 528 is less than zero. If so, then the memory controller 515 reprograms the memory cells at operation 806. Example ways to reprogram the memory cells are described herein with respect to FIGS. 9 and 10.

If the lower bound of the distribution is not less than zero, the memory controller 515 selects a candidate read level at operation 808. The candidate read level selected at operation 808 can be less than the previous read level. For example, because the threshold voltages of the memory cells may tend to be reduced over time, the candidate read level can be similarly reduced. At operation 810, the memory controller 515 reads the memory cells at the candidate read level to generate a candidate raw string. The memory controller 515 determines if the difference between Bit0 and Bit1 in the candidate raw string is not greater than a threshold value. If yes, then the candidate read level is used as the next read level to generate PUF values. For example, the memory device 515 may use the candidate raw string to generate a PUF value 524 and/or use the next read level to generate one or more additional raw strings and use those raw strings to generate a PUV value 524.

If the candidate raw string has a difference between Bit0 and Bit1 that is greater than the threshold value, then the memory controller 515 determines, at operation 814, whether the difference between Bit0 and Bit1 is closer to the threshold value than the result of the most recent read level (e.g., the initial read level and/or a previous candidate read level). If yes, then the memory controller 515 selects a new candidate read level lower than the previous candidate read level at operation 808. If not, then the memory controller 515 selects a next candidate read level that is greater than the previous candidate read level at operation 816.

Figure 9:
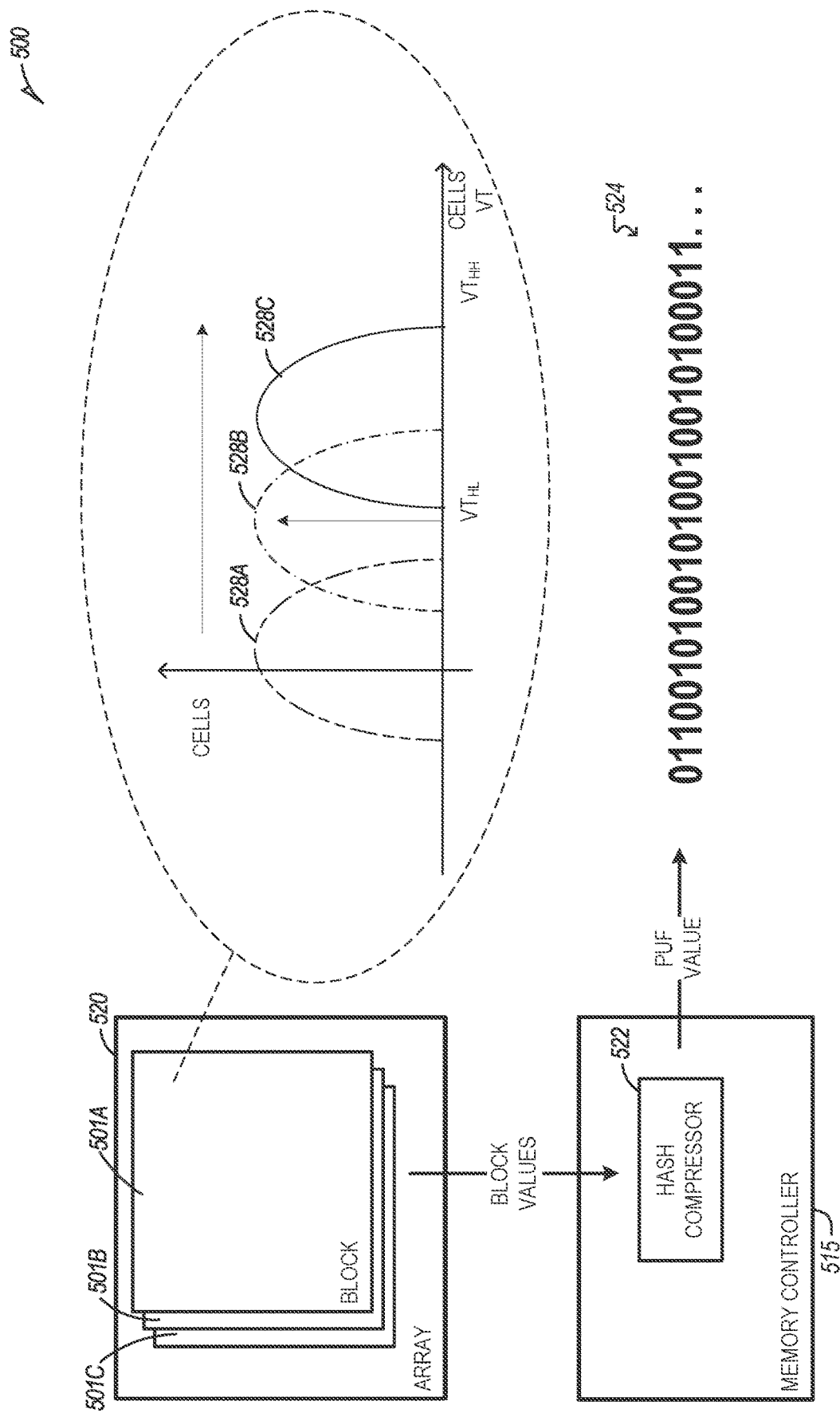
FIG. 9 illustrates an example of the environment of FIG. 5 in which the memory cells are reprogrammed.

In examples where the lower bound of the distribution 528 is less than zero and/or if the memory controller 515 otherwise fails to find a next read level meeting Equation [1] above, it may reprogram the memory cells. FIG. 9 illustrates an example of the environment 500 of FIG. 5 in which the memory cells are reprogrammed. In FIG. 5, the distribution 528A has a lower bound less than zero. The memory controller 515 can erase the memory cells.

Figure 10:
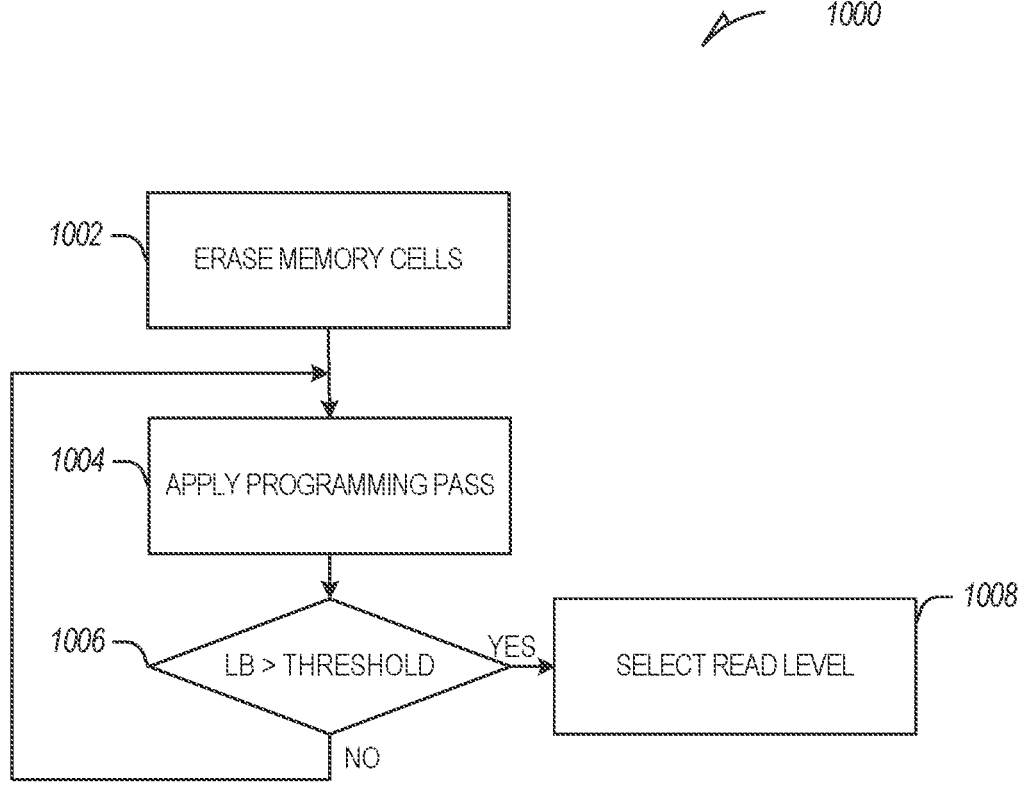
FIG. 10 is a flowchart showing one example of a process flow that can be executed by the memory controller to reprogram memory cells for generating a PUF value.

FIG. 10 is a flowchart showing one example of a process flow 1000 that can be executed by the memory controller 515 to reprogram memory cells for generating a PUF value. At operation 1002, the memory controller 515 erases the memory cells. At operation 1004, the memory controller 515 applies one or a predetermined number of programming pulses to the memory cells. At operation 1006, the memory controller 515 determines whether the current distribution of the memory cells has a lower bound greater than a threshold. If not, then the memory controller 515 can apply an additional one or more programming pulses at operation 1004. For example, if after operation 1004 the distribution looks like the distribution 528B having a lower bound below the threshold lower bound $VT_{HL}$, the memory controller 515 can return to operation 1004. On the other hand, if the distribution looks like the distribution 528C having a lower bound greater than the threshold lower bound $VT_{HL}$, the memory controller can, at operation 1008 select a new read level. The new read level can be determined, for example, as described with respect to FIG. 8.

Figure 11:
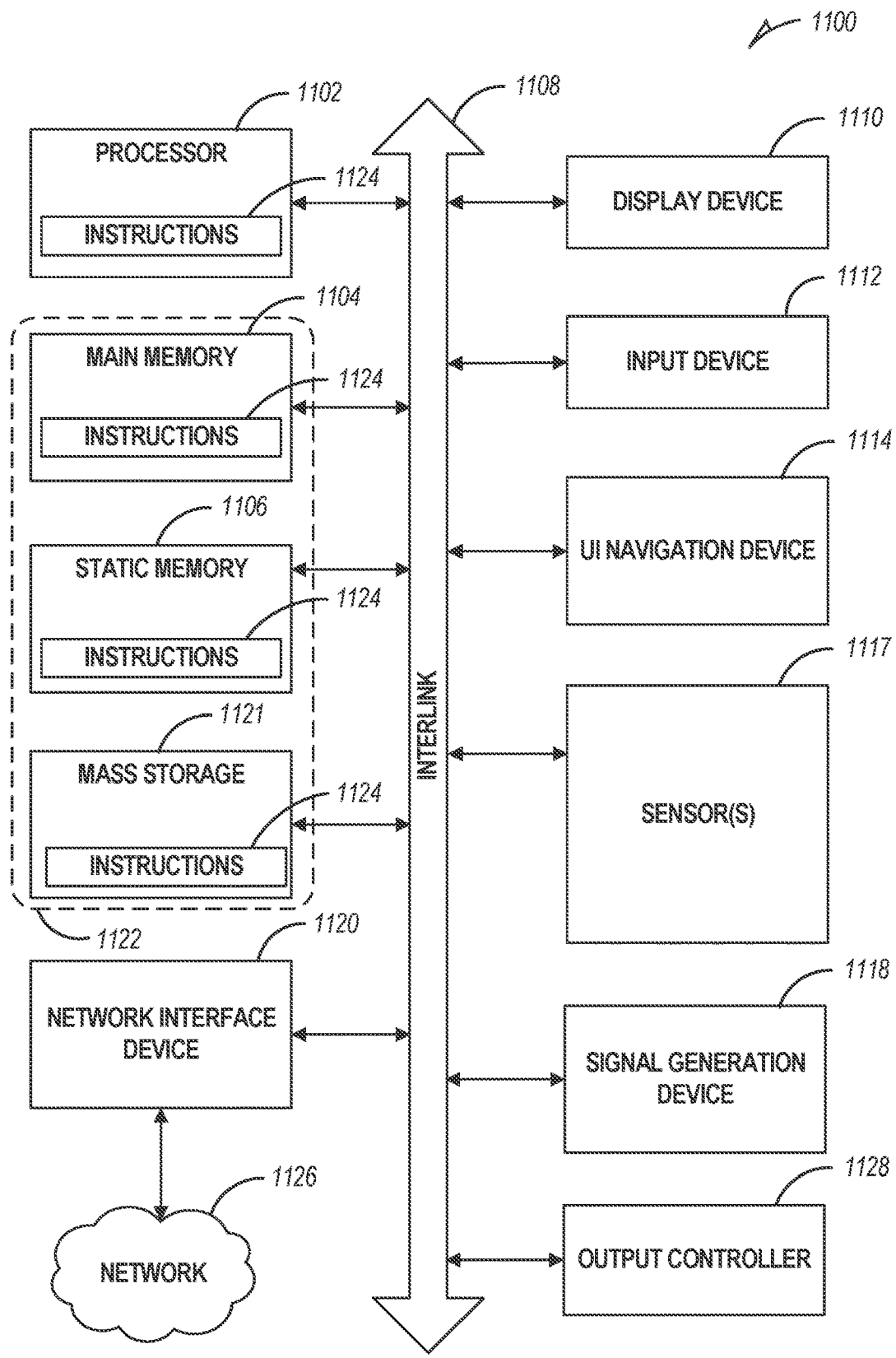
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1100 (e.g., the host device 105, the memory device 110, etc.) may include a hardware processor 1102 (e.g., a central processing unit (CPU), a graphics processing unit (GPU), a hardware processor core, or any combination thereof, such as the memory controller 115, etc.), a main memory 1104 and a static memory $N^{th}$ y 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1117, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a non-transitory machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute the machine readable medium 1122.

While the machine readable medium 1122 is illustrated as a single medium, the term "machine readable medium" may include a single medium or multiple media (e.g., a centralized or distributed database, or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 (e.g., software, programs, an operating system (OS), etc.) or other data are stored on the storage device 1121, can be accessed by the memory 1104 for use by the processor 1102. The memory 1104 (e.g., DRAM) is typically fast, but volatile, and thus a different type of storage than the storage device 1121 (e.g., an SSD), which is suitable for long-term storage, including while in an "off" condition. The instructions 1124 or data in use by a user or the machine 1100 are typically loaded in the memory 1104 for use by the processor 1102. When the memory 1104 is full, virtual space from the storage device 1121 can be allocated to supplement the memory 1104; however, because the storage 1121 device is typically slower than the memory 1104, and write speeds are typically at least twice as slow as read speeds, use of virtual memory can greatly reduce user experience due to storage device latency (in contrast to the memory 1104, e.g., DRAM). Further, use of the storage device 1121 for virtual memory can greatly reduce the usable lifespan of the storage device 1121.

In contrast to virtual memory, virtual memory compression (e.g., the Linux® kernel feature "ZRAM") uses part of the memory as compressed block storage to avoid paging to the storage device 1121. Paging takes place in the compressed block until it is necessary to write such data to the storage device 1121. Virtual memory compression increases the usable size of memory 1104, while reducing wear on the storage device 1121.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate, and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the control gate may form recesses, while the SGD may remain less recessed or even not recessed. These doping configurations may thus enable selective etching into the distinct tiers (e.g., SGS, control gate, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like. Example 1 is a method for generating a data value using a NAND flash array, the method comprising: reading a number of memory cells at the NAND flash array using an initial read level to generate a first raw string; determining that a difference between a number of bits from the first raw string having a value of logical zero and a number of bits from the first raw string having a value of logical one is greater than a threshold value; reading the number of memory cells at the NAND flash array using a second read level to generate a second raw string; determining that a difference between a number of bits from the second raw string having a value of logical zero and a number of bits from the second raw string having a value of logical one is not greater than a threshold value; and applying a cryptographic function using the second raw string to generate a first data value.

In Example 2, the subject matter of Example 1 optionally includes wherein the reading of the number of memory cells at the NAND flash array using the initial read level is responsive to a power-up of the NAND flash array.

In Example 3, the subject matter of any one or more of Examples 1-2 optionally includes selecting a candidate second read level that is lower than the initial read level; reading the number of memory cells at the NAND flash array using the candidate second read level to generate a candidate raw string; determining that a difference between a number of bits from the candidate raw string having a value of logical zero and a number of bits from the candidate raw string having a value of logical one is greater than the threshold value; determining that the difference between the number of bits from the candidate raw string having a value of logical zero and a number of bits from the candidate raw string having a value of logical one is closer to the threshold value than the difference between the number of bits from the first raw string having a value of logical zero and a number of bits from the first raw string having a value of logical one; and selecting a subsequent candidate second read level that is lower than the candidate second read level.

In Example 4, the subject matter of any one or more of Examples 1-3 optionally includes rereading the number of memory cells at the NAND flash array using the second read level to generate a third raw string; determining that a difference between a number of bits from the third raw string having a value of logical zero and a number of bits from the second raw string having a value of logical one is greater than the threshold value; and determining that a search for a next read level has failed.

In Example 5, the subject matter of Example 4 optionally includes wherein determining that the search for the next read level has failed comprises determining that at least a portion of the number of memory cells at the NAND flash array has a cell read level less than zero.

In Example 6, the subject matter of any one or more of Examples 4-5 optionally includes erasing a block of the NAND flash array comprising the number of memory cells; applying a first programming pulse to the number of memory cells; determining that at least a portion of the number of memory cells of the NAND flash array have a cell read level less than a low read level value; and applying a second programming pulse to the number of memory cells of the NAND flash array.

In Example 7, the subject matter of Example 6 optionally includes after applying the second programming pulse to the number of memory cells of the NAND flash array, reading the number of memory cells at the NAND flash array using a third read level to generate a third raw string; determining that a difference between a number of bits from the third raw string having a value of logical zero and a number of bits from the first raw string having a value of logical one is not greater than a threshold value; and applying a cryptographic function using the third raw string to generate a second data value.

In Example 8, the subject matter of Example 7 optionally includes selecting the third read level using a distribution of cell read levels of the number of memory cells of the NAND flash array.

Example 9 is a system for generating data values, comprising: a NAND flash array; and a memory controller configured to perform operations comprising: reading a number of memory cells at the NAND flash array using an initial read level to generate a first raw string; determining that a difference between a number of bits from the first raw string having a value of logical zero and a number of bits from the first raw string having a value of logical one is greater than a threshold value; reading the number of memory cells at the NAND flash array using a second read level to generate a second raw string; determining that a difference between a number of bits from the second raw string having a value of logical zero and a number of bits from the second raw string having a value of logical one is not greater than a threshold value; and applying a cryptographic function using the second raw string to generate a first data value.

In Example 10, the subject matter of Example 9 optionally includes wherein the reading of the number of memory cells at the NAND flash array using the initial read level is responsive to a power-up of the NAND flash array.

In Example 11, the subject matter of any one or more of Examples 9-10 optionally includes the operations further comprising: selecting a candidate second read level that is lower than the initial read level; reading the number of memory cells at the NAND flash array using the candidate second read level to generate a candidate raw string; determining that a difference between a number of bits from the candidate raw string having a value of logical zero and a number of bits from the candidate raw string having a value of logical one is greater than the threshold value; determining that the difference between the number of bits from the candidate raw string having a value of logical zero and a number of bits from the candidate raw string having a value of logical one is closer to the threshold value than the difference between the number of bits from the first raw string having a value of logical zero and a number of bits from the first raw string having a value of logical one; and selecting a subsequent candidate second read level that his lower than the candidate second read level.

In Example 12, the subject matter of any one or more of Examples 9-11 optionally includes the operations further comprising: rereading the number of memory cells at the NAND flash array using the second read level to generate a third raw string; determining that a difference between a number of bits from the third raw string having a value of logical zero and a number of bits from the second raw string having a value of logical one is greater than the threshold value; and determining that a search for a next read level has failed.

In Example 13, the subject matter of Example 12 optionally includes wherein determining that the search for the next read level has failed comprises determining that at least a portion of the number of memory cells at the NAND flash array has a cell read level less than zero.

In Example 14, the subject matter of any one or more of Examples 12-13 optionally includes the operations further comprising: erasing a block of the NAND flash array comprising the number of memory cells; applying a first programming pulse to the number of memory cells; determining that at least a portion of the number of memory cells of the NAND flash array have a cell read level less than a low read level value; and applying a second programming pulse to the number of memory cells of the NAND flash array.

In Example 15, the subject matter of Example 14 optionally includes the operations further comprising: after applying the second programming pulse to the number of memory cells of the NAND flash array, reading the number of memory cells at the NAND flash array using a third read level to generate a third raw string; determining that a difference between a number of bits from the third raw string having a value of logical zero and a number of bits from the first raw string having a value of logical one is not greater than a threshold value; and applying a cryptographic function using the third raw string to generate a second data value.

In Example 16, the subject matter of Example 15 optionally includes the operations further comprising selecting the third read level using a distribution of cell read levels of the number of memory cells of the NAND flash array.

Example 17 is a non-transitory computer readable medium having instructions thereon that, when executed by at least one processor, causes the processor to perform operations comprising: reading a number of memory cells at a NAND flash array using an initial read level to generate a first raw string; determining that a difference between a number of bits from the first raw string having a value of logical zero and a number of bits from the first raw string having a value of logical one is greater than a threshold value; reading the number of memory cells at the NAND flash array using a second read level to generate a second raw string; determining that a difference between a number of bits from the second raw string having a value of logical zero and a number of bits from the second raw string having a value of logical one is not greater than a threshold value; and applying a cryptographic function using the second raw string to generate a first data value.

In Example 18, the subject matter of Example 17 optionally includes wherein the reading of the number of memory cells at the NAND flash array using the initial read level is responsive to a power-up of the NAND flash array.

In Example 19, the subject matter of any one or more of Examples 17-18 optionally includes the operations further comprising: selecting a candidate second read level that is lower than the initial read level; reading the number of memory cells at the NAND flash array using the candidate second read level to generate a candidate raw string; determining that a difference between a number of bits from the candidate raw string having a value of logical zero and a number of bits from the candidate raw string having a value of logical one is greater than the threshold value; determining that the difference between the number of bits from the candidate raw string having a value of logical zero and a number of bits from the candidate raw string having a value of logical one is closer to the threshold value than the difference between the number of bits from the first raw string having a value of logical zero and a number of bits from the first raw string having a value of logical one; and selecting a subsequent candidate second read level that his lower than the candidate second read level.

In Example 20, the subject matter of any one or more of Examples 17-19 optionally includes the operations further comprising: rereading the number of memory cells at the NAND flash array using the second read level to generate a third raw string; determining that a difference between a number of bits from the third raw string having a value of logical zero and a number of bits from the second raw string having a value of logical one is greater than the threshold value; and determining that a search for a next read level has failed.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for generating a data value using a memory array, the method comprising:
reading a number of memory cells at the memory array using a first read level to generate a first raw string;
determining that a difference between a number of bits from the first raw string having a value of logical zero and a number of bits from the first raw string having a value of logical one is not greater than a threshold value; and
applying a cryptographic function using the first raw string to generate a first data value.

2. The method of claim 1, further comprising:
before reading the number of memory cells at the memory array using the first read level, reading a number of memory cells at the memory array using an initial read level to generate an initial raw string;
determining that a difference between a number of bits from the initial raw string having a value of logical zero and a number of bits from the initial raw string having a value of logical one is greater than a threshold value; and
responsive to determining that the difference between the number of bits from the initial raw string having a value of logical zero and the number of bits from the initial raw string having a value of logical one is greater than the threshold value, selecting a next read level.

3. The method of claim 2, wherein the reading of the number of memory cells at the memory array using the initial read level is responsive to a power-up of the memory array.

4. The method of claim 2, further comprising:
selecting a candidate next read level that is lower than the initial read level;
reading the number of memory cells at the memory array using the candidate next read level to generate a candidate raw string;
determining that a difference between a number of bits from the candidate raw string having a value of logical zero and a number of bits from the candidate raw string having a value of logical one is greater than the threshold value;
determining that the difference between the number of bits from the candidate raw string having a value of logical zero and a number of bits from the candidate raw string having a value of logical one is closer to the threshold value than the difference between the number of bits from the initial raw string having a value of logical zero and a number of bits from the initial raw string having a value of logical one; and
selecting a subsequent candidate next read level that is lower than the candidate next read level.

5. The method of claim 4, further comprising:
rereading the number of memory cells at the memory array using the subsequent candidate next read level to generate a third raw string;
determining that a difference between a number of bits from the third raw string having a value of logical zero and a number of bits from the first raw string having a value of logical one is greater than the threshold value; and
determining that a search for a next read level has failed.

6. The method of claim 5, wherein determining that the search for the next read level has failed comprises determining that at least a portion of the number of memory cells at the memory array has a cell read level less than zero.

7. The method of claim 5, further comprising:
erasing a block of the memory array comprising the number of memory cells;
applying a first programming pulse to the number of memory cells;
determining that at least a portion of the number of memory cells of the memory array have a cell read level less than a low read level value; and
applying a second programming pulse to the number of memory cells of the memory array.

8. The method of claim 7, further comprising:
after applying the second programming pulse to the number of memory cells of the memory array, reading the number of memory cells at the memory array using a third read level to generate a third raw string;
determining that a difference between a number of bits from the third raw string having a value of logical zero and a number of bits from the initial raw string having a value of logical one is not greater than a threshold value; and applying a cryptographic function using the third raw string to generate a second data value.

9. The method of claim 8, further comprising selecting the third read level using a distribution of cell read levels of the number of memory cells of the memory array.

10. A system for generating data values, comprising:
a memory array; and
a memory controller configured to perform operations comprising:
reading a number of memory cells at the memory array using a first read level to generate a first raw string;
determining that a difference between a number of bits from the first raw string having a value of logical zero and a number of bits from the first raw string having a value of logical one is not greater than a threshold value; and
applying a cryptographic function using the first raw string to generate a first data value.

11. The system of claim 10, the operations further comprising:
before reading the number of memory cells at the memory array using the first read level, reading a number of memory cells at the memory array using an initial read level to generate an initial raw string;
determining that a difference between a number of bits from the initial raw string having a value of logical zero and a number of bits from the initial raw string having a value of logical one is greater than a threshold value; and
responsive to determining that the difference between the number of bits from the initial raw string having a value of logical zero and the number of bits from the initial raw string having a value of logical one is greater than the threshold value, selecting a next read level.

12. The system of claim 11, wherein the reading of the number of memory cells at the memory array using the initial read level is responsive to a power-up of the memory array.

13. The system of claim 11, the operations further comprising:
selecting a candidate next read level that is lower than the initial read level;
reading the number of memory cells at the memory array using the candidate next read level to generate a candidate raw string;
determining that a difference between a number of bits from the candidate raw string having a value of logical zero and a number of bits from the candidate raw string having a value of logical one is greater than the threshold value;
determining that the difference between the number of bits from the candidate raw string having a value of logical zero and a number of bits from the candidate raw string having a value of logical one is closer to the threshold value than the difference between the number of bits from the initial raw string having a value of logical zero and a number of bits from the initial raw string having a value of logical one; and
selecting a subsequent candidate next read level that his lower than the candidate next read level.

14. The system of claim 13, the operations further comprising:
rereading the number of memory cells at the memory array using the subsequent candidate next read level to generate a third raw string;
determining that a difference between a number of bits from the third raw string having a value of logical zero and a number of bits from the first raw string having a value of logical one is greater than the threshold value; and
determining that a search for a next read level has failed.

15. The system of claim 14, wherein determining that the search for the next read level has failed comprises determining that at least a portion of the number of memory cells at the memory array has a cell read level less than zero.

16. The system of claim 14, the operations further comprising:
erasing a block of the memory array comprising the number of memory cells;
applying a first programming pulse to the number of memory cells;
determining that at least a portion of the number of memory cells of the memory array have a cell read level less than a low read level value; and
applying a second programming pulse to the number of memory cells of the memory array.

17. The system of claim 16, the operations further comprising:
after applying the second programming pulse to the number of memory cells of the memory array, reading the number of memory cells at the memory array using a third read level to generate a third raw string;
determining that a difference between a number of bits from the third raw string having a value of logical zero and a number of bits from the initial raw string having a value of logical one is not greater than a threshold value; and
applying a cryptographic function using the third raw string to generate a second data value.

18. The system of claim 17, the operations further comprising selecting the third read level using a distribution of cell read levels of the number of memory cells of the memory array.

19. A non-transitory computer readable medium having instructions thereon that, when executed by at least one processor, causes the at least one processor to perform operations comprising:
reading a number of memory cells at a memory array using a first read level to generate a first raw string;
determining that a difference between a number of bits from the first raw string having a value of logical zero and a number of bits from the first raw string having a value of logical one is not greater than a threshold value; and
applying a cryptographic function using the first raw string to generate a first data value.

20. The computer readable medium of claim 19, the operations further comprising:
before reading the number of memory cells at the memory array using the first read level, reading a number of memory cells at the memory array using an initial read level to generate an initial raw string;
determining that a difference between a number of bits from the initial raw string having a value of logical zero and a number of bits from the initial raw string having a value of logical one is greater than a threshold value; and responsive to determining that the difference between the number of bits from the initial raw string having a value of logical zero and the number of bits from the initial raw string having a value of logical one is greater than the threshold value, selecting a next read level.

\* \* \* \* \*